(12) United States Patent
Barleben et al.

(10) Patent No.: US 9,029,037 B2
(45) Date of Patent: May 12, 2015

(54) FUEL CELL SYSTEM WITH A LIQUID SEPARATOR

(75) Inventors: Roger-Marcelo Barleben, Hannover (DE); Uwe Limbeck, Kirchheim (DE); Cosimo S. Mazzotta, Ulm (DE); Hans-Joerg Pflugfelder, Schwieberdingen (DE); Manfred Strohmaier, Ohmden (DE)

(73) Assignee: Nucellsys GmbH, Kirchheim (DE)

( * ) Notice: Subject to any disclaimer, the term of this patent is extended or adjusted under 35 U.S.C. 154(b) by 2008 days.

(21) Appl. No.: 11/791,349

(22) PCT Filed: Oct. 17, 2005

(86) PCT No.: PCT/EP2005/011141
§ 371 (c)(1),
(2), (4) Date: May 22, 2007

(87) PCT Pub. No.: WO2006/056276
PCT Pub. Date: Jun. 1, 2006

(65) Prior Publication Data
US 2008/0090124 A1    Apr. 17, 2008

Related U.S. Application Data

(60) Provisional application No. 60/661,648, filed on Mar. 14, 2005.

(30) Foreign Application Priority Data

Nov. 25, 2004   (DE) .......................... 10 2004 056 952

(51) Int. Cl.
*H01M 8/04* (2006.01)
*H01M 8/10* (2006.01)

(52) U.S. Cl.
CPC ...... *H01M 8/04037* (2013.01); *H01M 8/04164* (2013.01); *H01M 8/04253* (2013.01); *H01M 8/04291* (2013.01); *H01M 2008/1095* (2013.01); *Y02E 60/50* (2013.01)

(58) Field of Classification Search
USPC .................................................. 429/440, 457
See application file for complete search history.

(56) References Cited

U.S. PATENT DOCUMENTS

| | | | |
|---|---|---|---|
| 5,200,278 A | 4/1993 | Watkins et al. | 429/24 |
| 5,677,074 A * | 10/1997 | Serpico et al. | 429/481 |
| 6,203,935 B1 | 3/2001 | Stühler et al. | 429/13 |
| 6,551,731 B1 * | 4/2003 | Berg et al. | 429/433 |
| 7,455,920 B2 | 11/2008 | Sakai | 429/13 |
| 2002/0094467 A1 * | 7/2002 | Nonobe et al. | 429/34 |

(Continued)

FOREIGN PATENT DOCUMENTS

| | | |
|---|---|---|
| JP | 07320766 A | 12/1995 |
| JP | 08315838 A | 11/1996 |

(Continued)

*Primary Examiner* — Patrick Ryan
*Assistant Examiner* — Lucas J O'Donnell
(74) *Attorney, Agent, or Firm* — Davidson, Davidson & Kappel, LLC (57) ABSTRACT

A fuel cell system (10) includes at least one fuel cell (12) provided with an anode area (14) and a cathode area (18) which is separated from the anode area (14) by an electrolyte (16) and a first liquid separator (42). A liquid out (60) of the first liquid separator (42) is connected to a second liquid separator (44) or cathode gas discharge line (24) via a first bypass line (78).

19 Claims, 6 Drawing Sheets

(56) References Cited

U.S. PATENT DOCUMENTS

| | | | |
|---|---|---|---|
| 2003/0044670 A1 | 3/2003 | Walsh | 429/34 |
| 2003/0049504 A1* | 3/2003 | Wheat et al. | 429/24 |
| 2005/0112424 A1* | 5/2005 | Hirano et al. | 429/20 |
| 2005/0142400 A1* | 6/2005 | Turco et al. | 429/13 |
| 2005/0238934 A1* | 10/2005 | Takahashi | 429/24 |
| 2005/0255351 A1* | 11/2005 | Fukuda | 429/22 |
| 2006/0035120 A1* | 2/2006 | Sakai | 429/22 |
| 2006/0063049 A1* | 3/2006 | Fujita | 429/24 |
| 2006/0159968 A1* | 7/2006 | Sudo et al. | 429/22 |
| 2007/0065711 A1* | 3/2007 | Gopal | 429/38 |

FOREIGN PATENT DOCUMENTS

| | | |
|---|---|---|
| JP | 2000/260459 | 9/2000 |
| JP | 2003297402 A | 10/2003 |
| JP | 2004006270 A | 1/2004 |
| JP | 2004185968 A | 7/2004 |

* cited by examiner

FUEL CELL SYSTEM WITH A LIQUID SEPARATOR

The invention relates to a fuel cell system having at least one fuel cell, which has an anode area as well as a cathode area, which is separated from the anode area by an electrolyte, and having a first liquid separator.

BACKGROUND

In typical fuel cells that are in use at the moment, a cathode area is separated by an electrolyte from an anode area, with the electrolyte that is used varying depending on the fuel cell type. For example, a proton-conductive membrane is used as the electrolyte in polymer electrolyte fuel cells. During operation of the fuel cell, hydrogen is supplied to the anode side and an oxidant containing oxygen, for example air, is supplied to the cathode side. The hydrogen molecules react at an anode catalytic converter, which is provided in the anode area, in accordance with the equation $$H_2 \rightarrow 2 \cdot H^+ + 2 \cdot e^-$$

and in the process emit electrons to the electrode, forming positively charged hydrogen ions.

The $H^+$-ions which are formed in the anode area then diffuse through the electrolyte to the cathode where they react on a cathode catalytic converter, which is provided in the cathode area, with the oxygen that is supplied to the cathode and with the electrons which have been passed to the cathode via an external circuit, in accordance with the equation $$0.5 \cdot O_2 + 2 \cdot H^+ + 2 \cdot e^- \rightarrow H_2O$$

to form water.

In all known fuel cell systems, water is thus formed as the reaction product of the electrochemical processes in the fuel cell. Furthermore, in some circumstances, additional water is introduced into the fuel cell system together with the reactants to be supplied to the anode area and/or to the cathode area. For example, moisture may be contained in the anode gases to be supplied to the anode area or else in the oxidant, for example air, to be supplied to the cathode area.

However, liquid water can block flow channels that are provided in the fuel cell system, in particular in the area of the fuel cell, and thus adversely affect the uniform distribution of the gaseous reactants in the system and in the fuel cell. This can have a negative effect on the extent of the reaction of the reactants in the fuel cell, thus having a negative effect on the efficiency of the overall system. Furthermore, liquid water in the fuel cell system can freeze at low temperatures, and this can lead to damage to the system components. Because of this, known fuel cell systems normally have liquid separators arranged at critical points in the system, in order to remove liquid water from the system.

By way of example, U.S. Pat. No. 5,200,278 describes a fuel cell system having a fuel cell, an anode gas supply line, an anode gas recirculation line, a cathode gas supply line and a cathode gas output line. A liquid separator with a reservoir for holding liquid water is provided in each case in the cathode gas output line and in the anode gas recirculation line. The water that is collected in the reservoir is periodically carried away from the reservoir. For this purpose, each water separator has a water output line, which is connected to the reservoir of the water separator, and a valve arranged in this water output line. When the water level in the reservoir of the water separator exceeds a predetermined height, the valve is opened, so that the water that has been collected in the reservoir can be carried away from the fuel cell system via the water output line.

Figure 1:
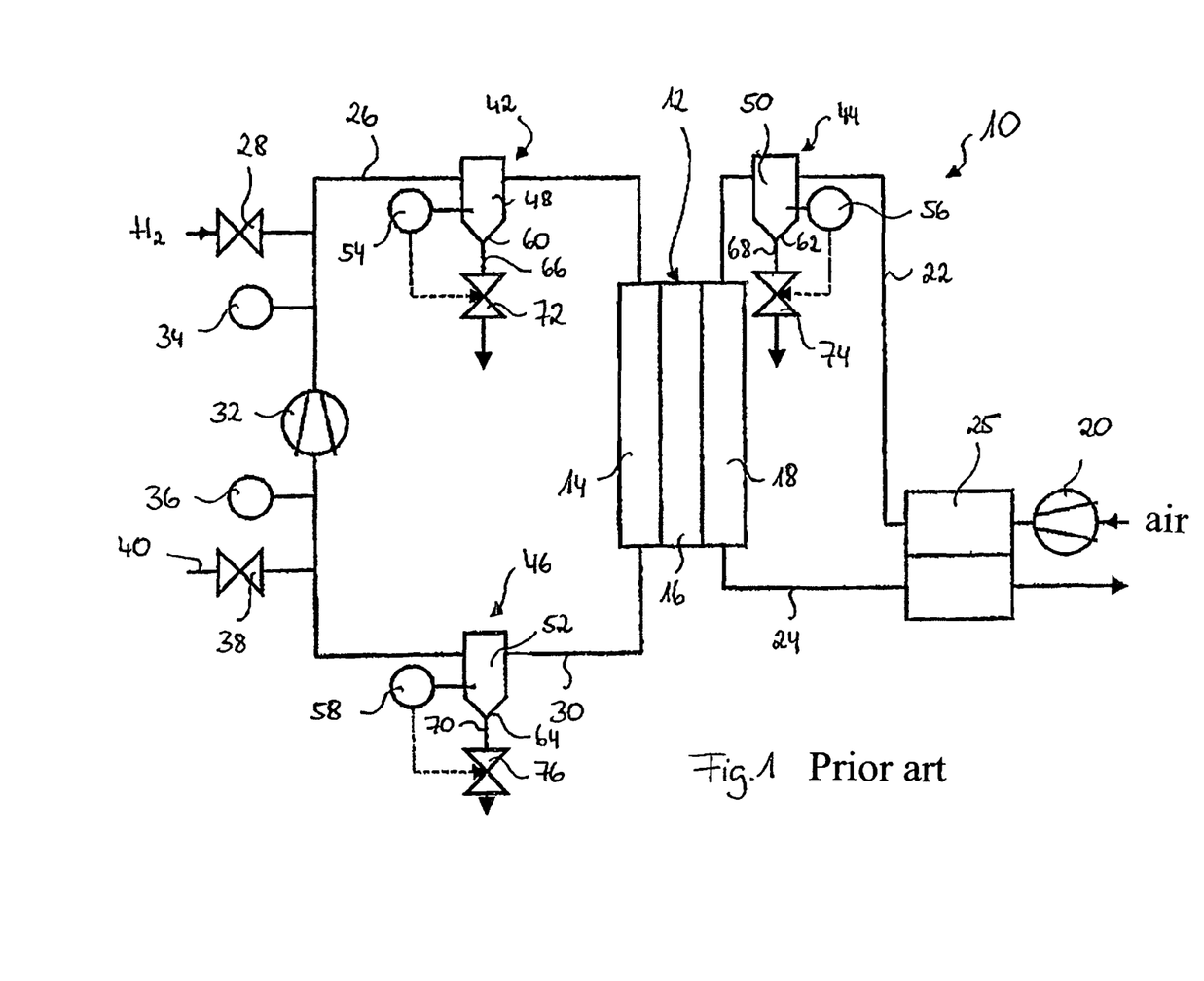
FIG. 1 shows a fuel cell system as known from the prior art.

A further fuel cell system 10, which is known from the prior art, is illustrated in FIG. 1. The fuel cell system 10 has a fuel cell 12 with an anode area 14, which is separated from a cathode area 18 by an electrolyte 16. Although only a single fuel cell 12 is shown in FIG. 1, the fuel cell system 10 has a plurality of fuel cells 12, which are stacked one above the other to form a so-called fuel cell stack.

The cathode area 18 of the fuel cell 12 is supplied with air via a cathode gas supply line 22, with the aid of a compressor 20. The cathode area 18 of the fuel cell 12 is also connected to a cathode gas output line 24 in order to emit cathode exhaust gases. A moisturizing system 25 is connected to the cathode gas supply line 22 and to the cathode gas output line 24 and, for example, is in the form of a gas-to-gas membrane moisturizer.

In contrast, the anode area 14 of the fuel cell 12 is connected to an anode gas supply line 26, through which hydrogen is supplied to the anode area 14. A first valve 28 is arranged in the anode gas supply line 26 in order to control the hydrogen supply to the anode area 14. An anode gas output line 30 is in the form of a recirculation line, in which a recirculation fan 32 is arranged, in order to convey anode exhaust gases, which emerge from the anode area 14 of the fuel cell 12, in the circuit. Sensors 34, 36 are provided in the anode gas output line 30, which is in the form of a recirculation line, in order to measure the pressure, the temperature and the relative humidity of the anode exhaust gases, as well as the hydrogen concentration in the anode exhaust gases. Furthermore, the anode gas output line 30 is connected via a second valve 38 to a purging line 40. Once the fuel cell system has been switched off, the second valve 38 can be opened, and the anode area 14 of the fuel cell 12 can be purged with a purging gas, for example air, which is supplied through the purging line 40.

In order to prevent liquid water from entering the anode area 14 or the cathode area 18 of the fuel cell 12, and blocking reactor flow channels in this area, liquid separators 42, 44 are in each case arranged in the anode gas supply line 26 and in the cathode gas supply line 22. A further liquid separator 46 is provided in the anode gas output line, in order to protect downstream components, for example sensors 34, 36 and the recirculation fan 32, against damage caused by freezing water at low temperatures.

Each liquid separator 42, 44, 46 has a reservoir 48, 50, 52 and is equipped with a level sensor 54, 56, 58 for measurement of the liquid level in the reservoir 48, 50, 52. A liquid outlet 60, 62, 64 of each liquid separator 42, 44, 46 is connected to a liquid output line 66, 68, 70, in each of which a valve 72, 74, 76 is provided. When a level sensor 54, 56, 58 indicates that the water level in the reservoir 48, 50, 52 of the associated liquid separator 42, 44, 46 has reached a predetermined height, the valve 72, 74, 76 associated with this liquid separator 42, 44, 46 is opened, so that the water which has been collected in the reservoir 48, 50, 52 can be carried away from the fuel cell system 10 through the liquid outlet 60, 62, 64 and the liquid output line 66, 68, 70.

In the known fuel cell system 10 that is illustrated in FIG. 1, each liquid separator 42, 44, 46 is equipped with a separate arrangement, which comprises the level sensor 54, 56, 58, the valves 72, 74, 76 as well as appropriate control components for driving the valves 72, 74, 76, for periodically emptying the water out of the reservoir 48, 50, 52 of the liquid separator 42, 44, 46 in a controlled manner. The system therefore has a multiplicity of individual components, which may be susceptible to defects, and in consequence has a relatively complex overall structure.

SUMMARY OF THE INVENTION

The invention is based on an object of providing a fuel cell system which makes it possible to ensure that liquid water is carried away from the system correctly, but which has a smaller number of individual components, and thus a simplified overall structure, than systems which are known from the prior art.

In the case of a fuel cell system according to the invention which has a first liquid separator, a liquid outlet of the first liquid separator is connected via a first bypass line to a second liquid separator, or to a cathode gas output line.

In an embodiment of the fuel cell system according to the invention there is no need to equip the first liquid separator with a separate arrangement for emptying liquid out of a reservoir for the first liquid separator, that is to say a level sensor for measurement of the liquid level in the reservoir, a valve for periodically emptying the liquid out of the reservoir in a controlled manner, as well as a control system for the valve. Instead of this, the liquid which has been separated out by the first liquid separator may be carried away from the first liquid separator continuously, via the first bypass line, in a simple manner and without the interposition of a valve.

In one embodiment of the fuel cell system according to the invention, the liquid outlet of the first liquid separator may be connected via the first bypass line to a cathode gas output line, so that the liquid which is passed out of the first liquid separator is continuously carried away from the fuel cell system, together with the cathode exhaust gases. However, as an alternative to this, it is also possible to connect the liquid outlet of the first liquid separator via the first bypass line to a second liquid separator. The liquid which is passed via the first bypass line out of the first liquid separator is then supplied continuously to the second liquid separator.

The invention thus makes it possible to use a particularly simple first liquid separator which, furthermore, can also be designed to be very compact since, if desired, it is even possible to dispense with the fitting of a reservoir to the first liquid separator. Furthermore, the arrangement according to the invention advantageously leads to a reduction in the number of individual components in the overall system. The fuel cell system according to the invention, which has a reduced number of individual components, and in particular of control components, is distinguished by particularly high reliability. Finally, the system according to the invention involves less production, assembly and maintenance effort than systems that are known from the prior art.

The fuel cell system according to the invention allows a range of advantageous refinements. For example, the first liquid separator can be arranged in an anode gas supply line via which hydrogen is supplied to an anode area of the fuel cell. The arrangement of the first liquid separator in the anode gas supply line prevents liquid water from entering an anode area of the fuel cell, and blocking reactant flow channels in this area. Furthermore, this prevents system components in the anode area of the fuel cell from being damaged by freezing water at low temperatures.

The liquid outlet of the first liquid separator is connected via the first bypass line either to the cathode gas output line or to the second liquid separator which, for example, may be arranged in a cathode gas supply line. A second liquid separator, which is arranged in the cathode gas supply line, prevents reactant flow channels in the cathode area of the fuel cell from being blocked by liquid water, and system components which are arranged in this area from being damaged by freezing water at low temperatures.

However, as an alternative to this, it is also possible to arrange the second liquid separator in an anode gas output line which, for example, is a recirculation line, or a cathode gas output line. A refinement of the fuel cell system according to the invention such as this is particularly worthwhile when sensitive components (which are connected downstream from the second liquid separator) in the fuel cell system are intended to be protected against damage by freezing water at low temperatures.

In a further advantageous embodiment of the fuel cell system according to the invention, the first liquid separator is arranged in the anode gas output line (which, for example, is a recirculation line), and the second liquid separator is arranged in the anode gas supply line, the cathode gas supply line or the cathode gas output line. However, as an alternative to this, it is also possible to arrange the first liquid separator in the cathode gas supply line and the second liquid separator in the anode gas output line (which, for example, is a recirculation line), the anode gas supply line or the cathode gas output line. Furthermore, the first liquid separator can be arranged in the cathode gas output line, and the second liquid separator can be arranged in the anode gas output line (which, for example, is a recirculation line), the anode gas supply line or the cathode gas supply line.

The first liquid separator is preferably arranged in a first area of the fuel cell system, in which there is a first pressure. The first bypass line connects the liquid outlet of the first liquid separator preferably to a second area of the fuel cell system, in which there is a second pressure, which is lower than the first pressure. An arrangement such as this ensures that liquid which has been separated out by the first liquid separator is carried away continuously in a simple manner from the liquid outlet of the first liquid separator in the direction of the pressure gradient that is produced in the fuel cell system.

The pressure in the anode area of the fuel cell is normally higher than that in the cathode area. A first liquid separator which is connected to the anode area of the fuel cell, that is to say a first liquid separator arranged in the anode gas supply line or the anode gas output line, can thus be connected in a simple manner via the first bypass line to the cathode gas output line, or can be connected to a second liquid separator which is connected to the cathode area of the fuel cell, that is to say a second liquid separator which is arranged in the cathode gas supply line or the cathode gas output line. The liquid is then continuously carried away from the liquid outlet of the first liquid separator in the direction of the pressure gradient that is produced in the fuel cell system. A pressure gradient which is normally produced between the anode gas supply line and the anode gas output line can then be used in a similar manner for emptying liquid out of the liquid outlet of a first liquid separator, which is arranged in the anode gas supply line, into a second liquid separator, which is arranged in the anode gas output line. Finally, a pressure gradient is also normally produced between the cathode gas supply line and the cathode gas output line and can be used to empty liquid out of the liquid outlet of a first liquid separator, which is arranged in the cathode gas supply line, into the cathode gas output line or into a second liquid separator, which is arranged in the cathode gas output line.

If it is intended to empty liquid out of the liquid outlet of the first liquid separator against a pressure gradient that has been produced in the fuel cell system, the fuel cell system according to the invention preferably has a first feed device for feeding liquid to be carried away from the liquid outlet of the first liquid separator into the cathode gas output line, or into the second liquid separator. A first feed device such as this, which, for example, is in the form of a pump, may also of course be used to help in carrying the liquid away from the liquid outlet of the first liquid separator. This is advantageous, for example, when the liquid output from the liquid outlet of the first liquid separator is intended to be in the direction of only a small pressure gradient, or in the direction of an area of the fuel cell system in which the pressure is the same as in the area surrounding the first liquid separator.

The second liquid separator preferably has a reservoir as well as a level sensor for measurement of the liquid level in the reservoir with a liquid outlet of the second liquid separator being connected to a liquid output line. The liquid which is continuously carried away from the first liquid separator can then be collected together with the liquid that has been separated out of the gas flow by the second liquid separator in the reservoir of the second liquid separator.

In one advantageous embodiment of the fuel cell system according to the invention, a valve is arranged in the liquid output line which is connected to the liquid outlet of the second liquid separator, which is designed to open the liquid output line when the liquid level in the reservoir of the second liquid separator has reached a predetermined height. In consequence, the liquid which has been collected in the reservoir of the second liquid separator can be carried away from the reservoir of the second liquid separator in a controlled manner, as required.

As an alternative to this, a liquid outlet of the second liquid separator may, however, also be connected via a second bypass line to a third liquid separator, or to the cathode gas output line. In an arrangement such as this, the second liquid separator can also be designed without separation for carrying liquid out of the second liquid separator, that is to say without a level sensor, a valve and a control system for the valve and, furthermore if desired, without a reservoir as well. Instead of this, the liquid which is separated out by the first and the second liquid separators is carried away continuously via the second bypass line out of the second liquid separator. As a consequence of this, it is possible to use a second liquid separator of particularly simple and compact design, and thus to further reduce the number of individual components in the overall system.

If the liquid outlet of the second liquid separator is connected via the second bypass line to the cathode gas output line, the liquid which is separated out by the first and the second liquid separators is carried away continuously, together with the cathode exhaust gases, from the fuel cell system, which is of particularly simple design. If the liquid outlet of the second liquid separator is connected via the second bypass line to the third liquid separator, the liquid which is separated out by the first and the second liquid separators is in contrast supplied continuously to the third liquid separator.

If the first liquid separator is arranged in an anode gas supply line, the second and the third liquid separators are preferably arranged in the anode gas output line, which for example is a recirculation line, the cathode gas output line or the cathode gas output line. By way of example, the second liquid separator can be arranged in the anode gas output line, and the third liquid separator in the cathode gas supply line.

As an alternative to this, however, the first liquid separator can also be arranged in the anode gas output line which, for example, is a recirculation line. The second and the third liquid separators are then preferably arranged in the anode gas supply line, the cathode gas supply line or the cathode gas output line. Furthermore, the first liquid separator can be placed in the cathode gas supply line, while the second and the third liquid separators are arranged in the anode gas output line which, for example, is a recirculation line, the anode gas supply line or the cathode gas output line. Finally, it is also possible to arrange the first liquid separator in the cathode gas output line, and the second and the third liquid separator in the anode gas output line which, for example, is a recirculation line, the anode gas supply line or the cathode gas supply line.

In one preferred embodiment of the fuel cell system according to the invention, the second liquid separator is arranged in a second area of the fuel cell system in which there is a second pressure. The second bypass line connects the liquid outlet of the second liquid separator preferably to a third area of the fuel cell system, in which there is a third pressure, which is lower than the second pressure. An arrangement such as this ensures that the liquid separated out by the first and the second liquid separator is carried away continuously and in a simple form from the liquid outlet of the second liquid separator in the direction of the pressure gradient which is produced in the fuel cell system.

Since, as mentioned above, there is normally a higher pressure in the anode area of the fuel cell than in the cathode area and, furthermore, there is a pressure gradient between the anode gas supply line and the anode gas output line or the cathode gas supply line and the cathode gas output line, these pressure differences which are produced between the individual areas of the fuel cell system can be used particularly efficiently if the first liquid separator is arranged in the anode gas supply line, the second liquid separator is arranged in the anode gas output line, and the third liquid separator is arranged in the cathode gas supply line or the cathode gas output line.

In the fuel cell system according to the invention, a second feed device which, for example, is in the form of a pump can be provided in order to feed liquid which must be carried away from the liquid outlet of the second liquid separator into the cathode gas output line or the third liquid separator. It is particularly worthwhile to provide a second feed device when the liquid from the liquid outlet of the second liquid separator is intended to be carried away against a pressure gradient which is produced in the fuel cell system, or the process of carrying the liquid away from the pressure outlet of the second liquid separator is intended to be assisted in the direction of only a minor pressure gradient or in the direction of an area of the fuel cell system in which the pressure is the same as in the area surrounding the second liquid separator.

The third liquid separator preferably has a reservoir as well as a level sensor for measurement of the liquid level in the reservoir, with a liquid outlet of the third liquid separator being connected to a liquid output line. The liquid which is carried away continuously from the first and the second liquid separator can then be collected, together with the liquid which is separated out from the gas flow by the third liquid separator, in the reservoir of the third liquid separator.

A valve can be arranged in the liquid output line which is connected to the liquid outlet of the third liquid separator, and is designed to open the liquid output line when the liquid level in the reservoir of the second liquid separator has reached a predetermined height. The water which has been collected in the reservoir of the third liquid separator can thus be carried away from the reservoir of the third liquid separator in a controlled manner, as required.

As an alternative to this, a liquid outlet of the third liquid separator may, however, also be connected via a third bypass line to the cathode gas output line. In an arrangement such as this, the third liquid separator can also be designed without a separate arrangement for carrying away liquid from the third liquid separator, that is to say without a level sensor, a valve and a control system for the valve and, furthermore, if desired, even without a reservoir. Instead of this, the liquid which is separated out by the first, the second and the liquid separator is carried away from the third liquid separator continuously via the third bypass line, so that it is even possible to use a third liquid separator which is of a particularly simple and compact design, thus also making it possible to further reduce the number of individual components in the overall system. If the first liquid separator is arranged in the anode gas supply line, the second liquid separator is arranged in the anode gas output line, and the third liquid separator is arranged in the cathode gas supply line and, furthermore, the liquid outlet of the third liquid separator is connected to the cathode gas output line, the pressure differences described above between the individual areas of the fuel cell system can be used particularly efficiently to carry liquid away from the individual liquid separators. However, it is also possible to provide a third feed device, for example, in the form of a pump, for feeding the liquid to be carried away from the liquid outlet of the third liquid separator.

It is self-evident that the liquid separators can also be connected to one another via respective bypass lines in the form of a series circuit if the fuel cell system has more than three liquid separators, in which case the liquid outlet of the "last" liquid separator in the series circuit, as described above, can be connected to the cathode gas output line or to a liquid output line. It is likewise possible for a first number of liquid separators to be connected via respective bypass lines in the form of a parallel circuit to a second number of liquid separators, or to a chosen liquid separator, whose liquid outlet, as described above, can be connected to the cathode gas output line or to a liquid output line.

It is particularly worthwhile connecting the liquid outlet of a liquid separator to the cathode gas output line when the aim is to achieve a fuel cell system of particularly simple and compact design. If this liquid separator or some other liquid separator which is connected to this liquid separator, for example, in the form of a series circuit is arranged in the anode gas supply line or in the anode gas output line, in order to remove liquid from a gas flow which is supplied to the anode area of the fuel cell or is being carried away from the anode area of the fuel cell, an arrangement such as this may, however, in some circumstances lead to hydrogen being introduced into the cathode exhaust gases, and thus to undesirable hydrogen emissions. In order to avoid such hydrogen emissions, the liquid outlet of this liquid separator is therefore preferably connected, as described above, to a separate liquid output line.

The first bypass line preferably opens into a fluid line which is connected to the inlet of the second liquid separator, that is to say, depending on the arrangement of the second liquid separator, for example in the anode gas supply line, the anode gas output line, the cathode gas supply line or the cathode gas output line. If the second liquid separator is arranged in the cathode gas supply line, a compressor for compression of the air to be supplied to the cathode area of the fuel cell can be provided upstream of the second liquid separator in the cathode gas output line. The first bypass line is preferably connected to the cathode gas supply line upstream of the compressor, since the pressure in this area of the cathode gas supply line is particularly low. The pressure gradient which is produced between different areas of the fuel cell system can then be optimally used to carry the liquid out of the liquid outlet of the first liquid separator.

As an alternative to this, however, the first bypass line can also be directly connected to the second liquid separator and, for example, can open into a reservoir for the second liquid separator.

In a similar manner, the second bypass line preferably opens into a fluid line which is connected to the inlet of the third liquid separator, that is to say, for example, into the anode gas supply line, the anode gas output line, the cathode gas supply line or the cathode gas output line, depending on the arrangement of the third liquid separator. If the third liquid separator is arranged in the cathode gas supply line, the third bypass line is preferably connected to the cathode gas supply line upstream of the compressor, which is likewise arranged in the cathode gas supply line, for compression of the air to be supplied to the cathode area of the fuel cell. The low pressure in this area can then be optimally used to carry the liquid away from the liquid outlet of the second liquid separator.

However, as an alternative to this, the second bypass line can also be connected directly to the third liquid separator and, for example, can open into a reservoir for the third liquid separator.

An orifice plate is preferably provided in the first, in the second and/or in the third bypass line. During operation of the fuel cell system according to the invention, operating states can occur in which no fluid is separated for a certain time period by a liquid separator which is connected via a bypass line to a further liquid separator or to the cathode gas output line. During this time period gases can emerge into the bypass line from the fluid line which is connected to the liquid separator. For example, if the first liquid separator is arranged in the anode gas supply line and does not separate any liquid out during specific operating phases of the fuel cell system, a leakage can thus occur of the anode gases to be supplied to the anode area of the fuel cell, into the first bypass line. The orifice plate which is provided in the first, in the second and/or in the third bypass line ensures that this leakage of gases into the first, into the second and/or into the third bypass line is kept as small as possible. The orifice plate is preferably designed such that the flow volume through the first, the second and/or the third bypass line is less than 5% of the volume flow fed through the respective fluid line, and flows through a diameter of less than 1.5 mm. The diameter for the flow to pass through the orifice plate is preferably in the range from 1 to 1.5 mm. A diameter of 1.1 mm is particularly preferable.

As an alternative or in addition to this, a liquid-filled U-tube can also be arranged in the first, in the second and/or in the third bypass line. The U-tube is preferably filled with water, with the water column in the U-tube producing a pressure which can be varied by the height of the water column and counteracts any leakage gas flow entering the first, the second and/or the third bypass line. In contrast, liquid to be carried away from the liquid outlet of the first, of the second and/or of the third liquid separator can be passed through the U-tube without any problems, and can be supplied to a liquid separator arranged downstream to the U-tube, or to the cathode gas output line.

In one advantageous embodiment of the fuel cell system according to the invention, means are provided for heating the first, the second and/or the third bypass line. In order to keep the leakage of gases into the first, into the second and/or into the third bypass line as small as possible, the first, the second and/or the third bypass line preferably have/has a relatively small diameter which, as described above, is preferably less than 1.5 mm in the area of the orifice plate. It can therefore be assumed at low temperatures that the bypass lines and/or the orifice plates are blocked by freezing water when the fuel cell system is not in use. This problem can be overcome, for example, by the provision of electrically heated bypass lines.

As an alternative or in addition to this, the first, the second and/or the third liquid separators/separator may have a reservoir which is designed such that it can store liquid to be carried away from the liquid separator/liquid separators until the first, the second and/or the third bypass line and/or the first, the second and/or the third orifice plate have/has been heated sufficiently during operation of the fuel cell system in order to ensure that the liquid is carried away from the liquid separator/liquid separators correctly in low temperatures, below the freezing point.

BRIEF DESCRIPTION OF THE DRAWINGS

Preferred embodiments of the fuel cell system according to the invention will be explained in more detail in the following text with reference to the attached schematic drawings, in which.

DETAILED DESCRIPTION

Figure 2:
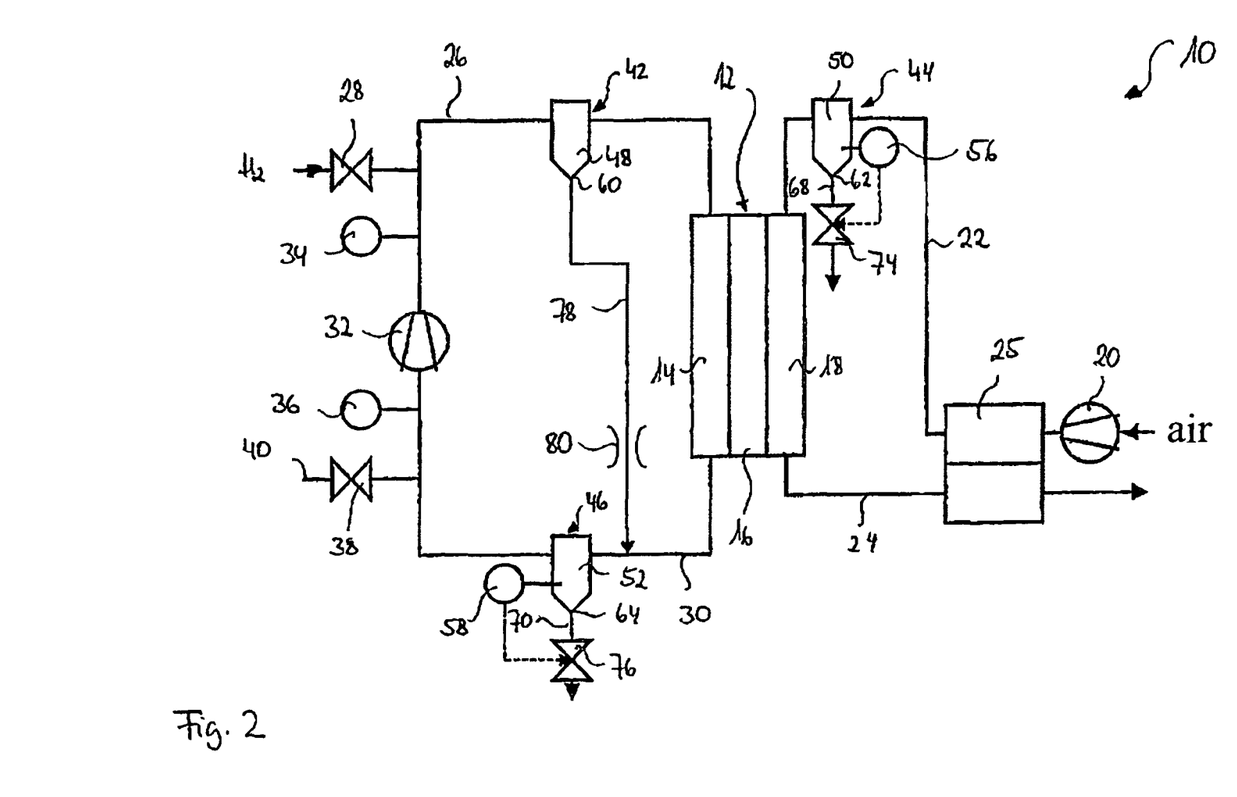
FIG. 2 shows a first exemplary embodiment of a fuel cell system according to the invention.

Like the fuel cell system as described above and illustrated in FIG. 1, the fuel cell system 10 illustrated in FIG. 2 also has a fuel cell 12 with an anode area 14 which is separated from a cathode area 18 by an electrolyte 18. Although FIG. 2 shows only a single fuel cell 12, the fuel cell system 10 has a plurality of fuel cells 12, which are stacked one on top of the other to form a so-called fuel cell stack.

Air is supplied to the cathode area 18 of the fuel cell 12 via a cathode gas supply line 22, with the aid of a compressor 20. The cathode area 18 of the fuel cell 12 is also connected to a cathode gas output line 24, in order to carry cathode exhaust gases away. A moisturization system 25 which, for example, is in the form of a gas-to-gas membrane moisturizer is connected to the cathode gas supply line 22 and to the cathode gas output line 24.

The anode area 14 of the fuel cell 12 is in contrast connected to an anode gas supply line 26, through which hydrogen is supplied to the anode area 14. A first valve 28 is arranged in the anode gas supply line 26, in order to control the supply of hydrogen to the anode area 14. An anode gas output line 30 is in the form of a recirculation line, in which a recirculation fan 32 is arranged, in order to circulate anode exhaust gases emerging from the anode area 14 of the fuel cell 12. Sensors 34, 36 are provided in the anode gas output line 30, which is in the form of a recirculation line, in order to measure the pressure, the temperature and the relative humidity of the anode exhaust gases, as well as the hydrogen concentration in the anode exhaust gases. Furthermore, the anode gas output line 30 is connected via a second valve 38 to a purging line 40. Once the fuel cell system has been switched off, the second valve 38 can be opened, and the anode area 14 of the fuel cell 12 can be purged with a purging gas, for example air, which is supplied through the purging line 40.

In order to prevent liquid water from entering the anode area 14 of the fuel cell 12, and blocking reactant flow channels that are provided in this area, a first liquid separator 42 is arranged in the anode gas supply line 26. A second liquid separator 46 is provided in the anode gas output line, in order to protect downstream components, for example the sensors 34, 36 and the recirculation fan 32, against damage caused by freezing water at low temperatures. A third liquid separator 44 which is arranged in the cathode gas supply line 22 prevents liquid water from entering the cathode area 18 of the fuel cell 12.

The liquid separators 44, 46 each have a reservoir 50, 52 and are equipped with a level sensor 56, 58 for measurement of the liquid level in the reservoir 50, 52. A liquid outlet 62, 64 of the liquid separators 44, 46 is respectively connected to a liquid output line 68, 70, in each of which a valve 74, 76 is provided. When a level sensor 56, 58 indicates that the water level in the reservoir 50, 52 of the associated liquid separator 44, 46 has reached a predetermined height, the valve 74, 76 associated with this liquid separator 44, 46 is opened, so that the water which has been collected in the reservoir 50, 52 can be carried away from the fuel cell system 10 through the liquid outlet 62, 64 and the liquid output line 68, 70.

In contrast to this, the first liquid separator 42 has neither a level sensor nor an associated valve. Instead of this, a liquid outlet 60 of the first liquid separator 42 is connected to the anode gas output line 30 via a first bypass line 78, which can be heated electrically, upstream of the second liquid separator 46. A first orifice plate 80 is provided in the first bypass line 78 and is designed such that the flow volume in the first bypass line 78 is less than 5% of the flow volume fed through the anode gas supply line 26. The first orifice plate 80 has a diameter of 1.1 mm for the flow to pass through.

During operation of the fuel cell system 10, water which has been separated out by the first liquid separator 42 is passed continuously via the first bypass line 78 out of a reservoir 48 for the first liquid separator 42 into the anode gas output line 30, and is supplied to the second liquid separator 46, making use of a pressure gradient which is produced between the anode gas supply line 26 and the anode gas output line 30. During operating phases in which no water is separated out by the first liquid separator 42 from the gas flow to be supplied to the anode area 14 of the fuel cell 12, and is carried away via the first bypass line 78, the first orifice plate 80 ensures that any leakage of gases from the anode gas supply line 26 into the first bypass line 78 is kept as small as possible.

Owing to the small flow cross sections of the first bypass line 78 and, in particular, of the first orifice plate 80, it can be assumed at low temperatures that the first bypass line 78 and/or the first orifice plate 80 are blocked by freezing water when the fuel cell system is not in use. The reservoir 48 for the first liquid separator 42 is therefore designed such that it is able for this purpose to store water which has been separated out from the gas flow passed through the anode gas supply line 26 and is intended to be carried away through the first bypass line 78 until the first bypass line 78 has been heated sufficiently by the electrical heating and/or by the heat created during operation of the fuel cell system 10 in order to overcome any blockage formed by ice in the first bypass line 78 and/or the first orifice plate 80.

Figure 3:
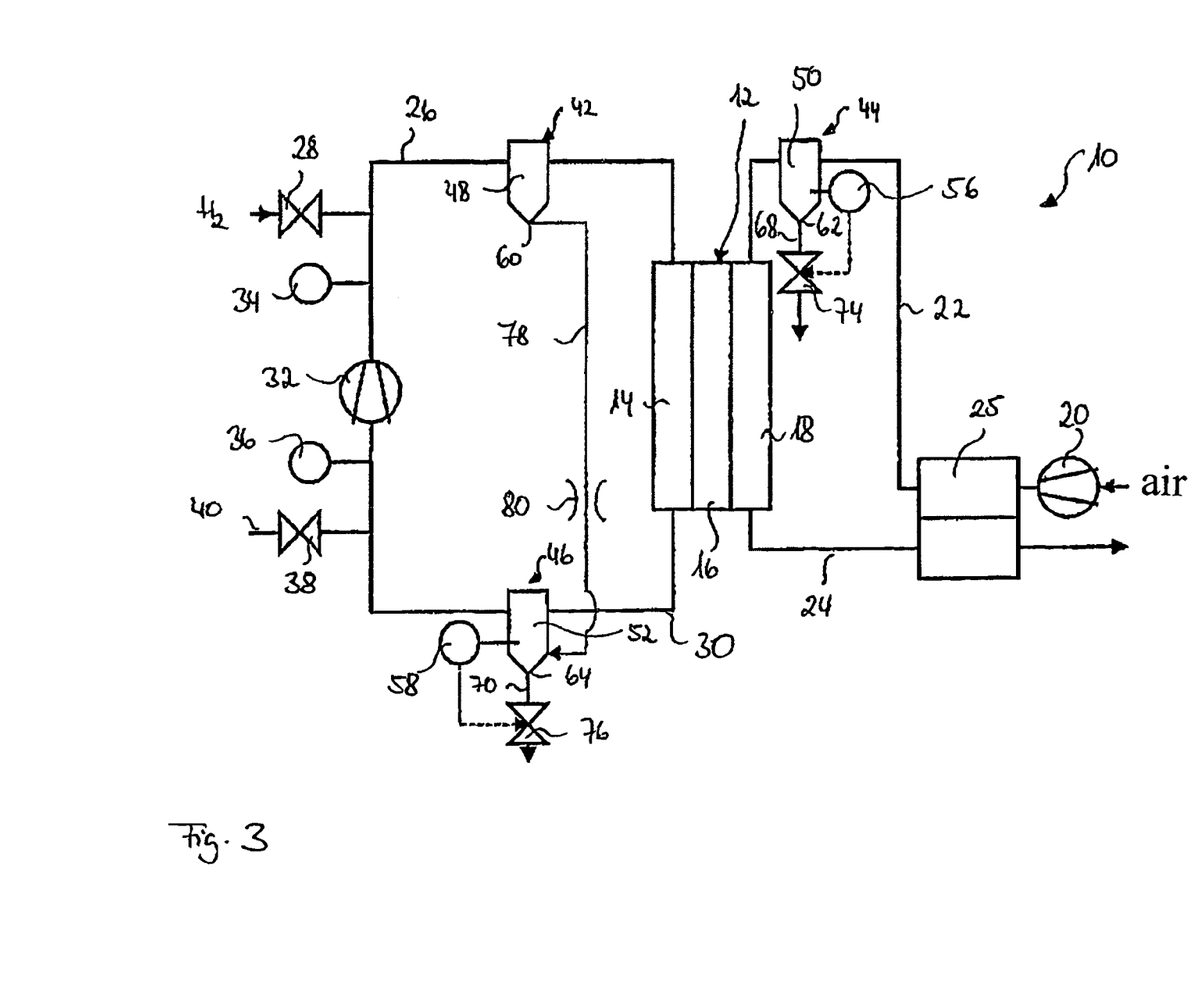
FIG. 3 shows a second exemplary embodiment of a fuel cell system according to the invention.

The fuel cell system 10 illustrated in FIG. 3 differs from the arrangement illustrated in FIG. 2 in that the first bypass line 78 does not open into the anode gas output line 30, but is connected directly to the reservoir 50 for the second liquid separator 46. Apart from this, the design and operation of the fuel cell system 10 illustrated in FIG. 3 correspond to the design and operation of the arrangement illustrated in FIG. 2.

Figure 4:
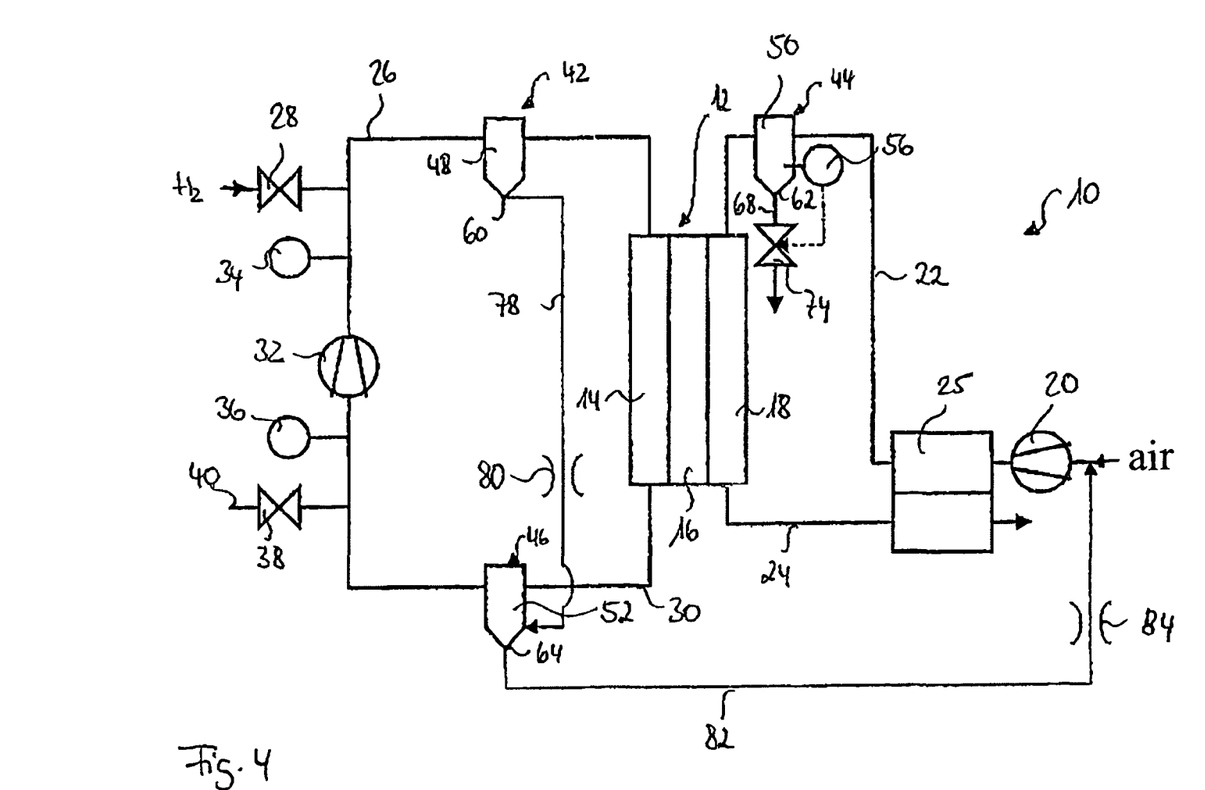
FIG. 4 shows a third exemplary embodiment of a fuel cell system according to the invention.

The fuel cell system 10 illustrated in FIG. 4 differs from the arrangement illustrated in FIG. 3 in that the second liquid separator 46, which is arranged in the anode gas output line 30, also has neither a level sensor nor an associated valve.

Instead of this, the liquid outlet 64 of the second liquid separator 46 is connected to the cathode gas supply line 22 via a second bypass line 82, which can be heated electrically, upstream of the compressor 20 which is provided in the cathode gas supply line 22. A second orifice plate 84 is provided in the second bypass line 82 and is designed such that the flow volume in the second bypass line 82 is less than 5% of the flow volume fed through the anode gas output line 30, and it has a diameter of 1.1 mm for the flow to pass through.

During operation of the fuel cell system 10, water which has been separated out by the first liquid separator 42 is passed continuously via the first bypass line 78 from the reservoir 48 for the first liquid separator 42, and is supplied to the reservoir 52 for the second liquid separator 46, making use of the pressure gradient which is produced between the anode gas supply line 26 and the anode gas output line 30. At the same time, water is carried away continuously from the reservoir 52 for the second liquid separator 46 via the second bypass line 82 into the cathode gas supply line 22. Since the pressure in the area of the compressor 20 is particularly low, the pressure gradient which is produced between the anode gas output line 30 and that area of the cathode gas supply line 22 which is arranged upstream of the compressor 20 can be used optimally to carry the water out of the liquid outlet 64 of the second liquid separator 46. The water which has been passed through the second bypass line 82 into the cathode gas supply line 22 is then fed through the compressor 20 together with the airflow to be supplied to the cathode area 18 of the fuel cell 12, into the third liquid separator 44. The second orifice plate 84 ensures that, during operating phases in which no water is carried away from the first or the second liquid separator 42, 46 via the second bypass line 82, any leakage of gases from the anode gas output line 30 into the second bypass line 82 is kept as small as possible.

Like the reservoir 48 for the first liquid separator 42, the reservoir 52 for the second liquid separator 46 is also designed such that it is able for this purpose to store water which is intended to be carried away through the second bypass line 82 until the second bypass line 82 has been heated sufficiently by the electrical heating and/or by the heat created during operation of the fuel cell system 10 in order to overcome any blockage formed by ice in the second bypass line 82 and/or in the second orifice plate 84.

Figure 5:
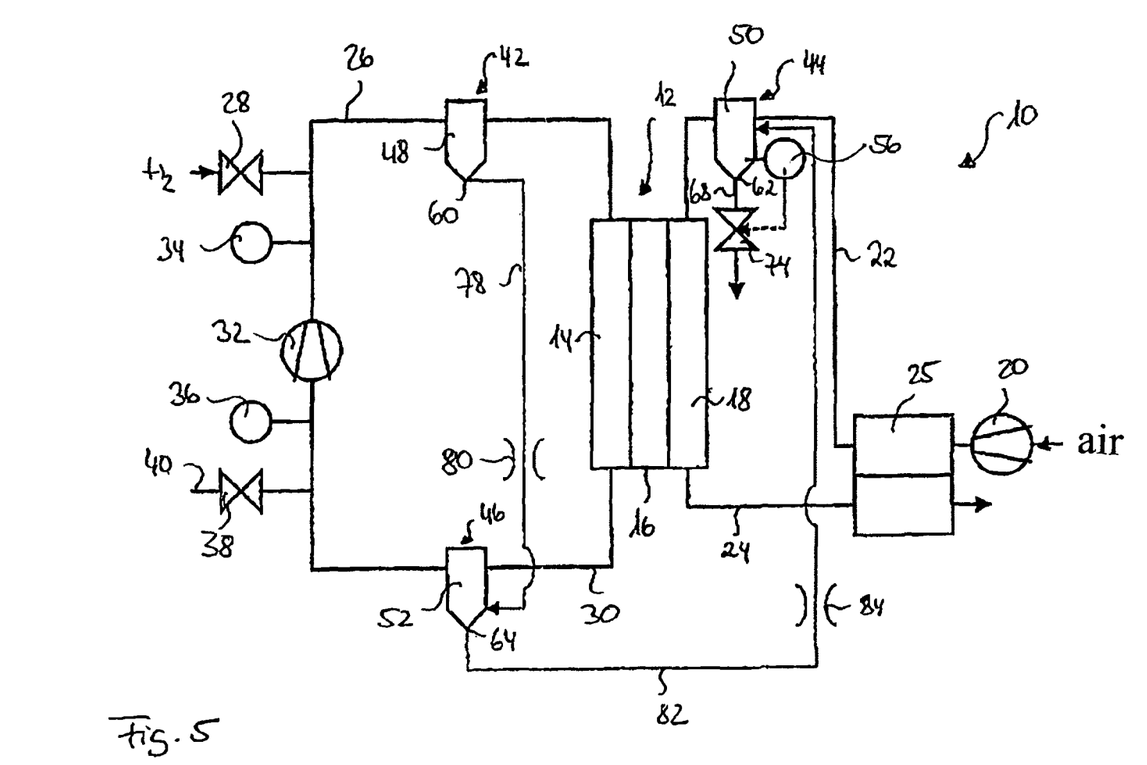
FIG. 5 shows a fourth exemplary embodiment of a fuel cell system according to the invention.

The fuel cell system 10 illustrated in FIG. 5 differs from the arrangement illustrated in FIG. 4 in that the second bypass line 82 does not open into the cathode gas supply line 22 upstream of the compressor 20, but is connected directly to the reservoir 50 for the third liquid separator 44. The pressure relationships in the fuel cell system 10 are in this case set such that the pressure in the anode gas output line 30 is greater than the pressure in the area of the third liquid separator 44, thus ensuring that water is carried away correctly from the liquid outlet 64 of the second liquid separator 46 into the third liquid separator 44. Apart from this, the design and the operation of the fuel cell system 10 illustrated in FIG. 5 correspond to the design and the operation of the arrangement illustrated in FIG. 4.

Figure 6:
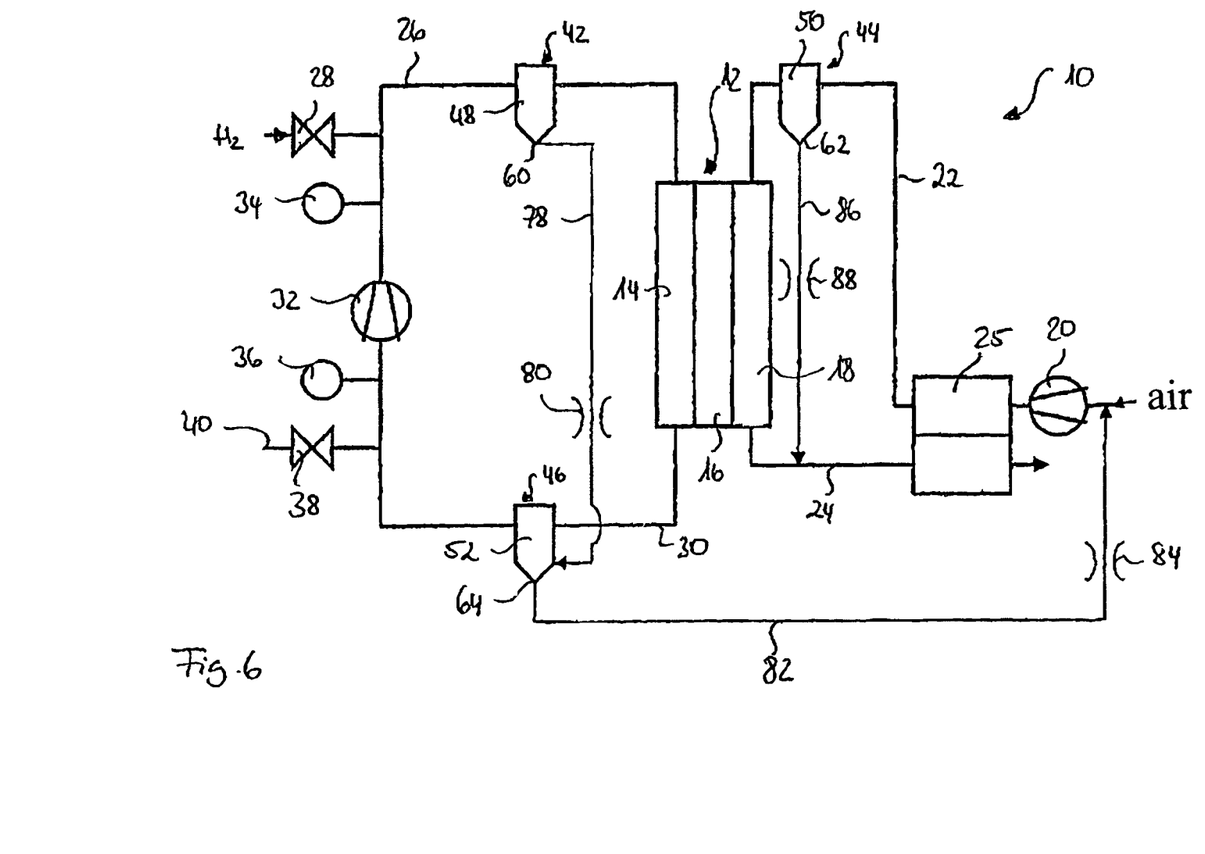
FIG. 6 shows a fifth exemplary embodiment of a fuel cell system according to the invention.

The fuel cell system 10 which is illustrated in FIG. 6 and whose design is particularly simple differs from the arrangement illustrated in FIG. 4 in that the third liquid separator 44, which is arranged in the cathode gas supply line 22, is also no longer equipped with a level sensor and an associated valve. Instead of this, the liquid outlet 62 of the third liquid separator 44 is connected to the cathode gas output line 24 via a third bypass line 86, which can be heated electrically. A third orifice plate 88 is provided in the third bypass line 86, and is designed such that the flow volume in the third bypass line 86 is less than 5% of the flow volume fed through the cathode gas supply line 22, and it has a diameter of 1.1 mm for the flow to pass through.

During operation of the fuel cell system 10, water which has been separated out by the first liquid separator 42 is passed continuously via the first bypass line 78 from a reservoir 48 for the first liquid separator 42, into the anode gas output line 30, and is supplied to the second liquid separator 46, making use of the pressure gradient which is produced between the anode gas supply line 26 and the anode gas output line 30. At the same time, water is carried away continuously from the reservoir 52 for the second liquid separator 46 via the second bypass line 82 into the cathode gas supply line 22. Since the pressure in the area of the compressor 20 is particularly low, the pressure gradient which is produced between the anode gas output line 30 and that area of the cathode gas supply line 22 which is arranged upstream of the compressor 20 can be used optimally to carry the water out of the liquid outlet 64 of the second liquid separator 46. The water which has been passed through the second bypass line 82 into the cathode gas supply line 22 is then fed through the compressor 20, together with the airflow to be supplied to the cathode area 18 of the fuel cell 12, into the third liquid separator 44. Finally, the water is also carried from the reservoir 50 for the third liquid separator 44 in a continuous form and using the pressure gradient which is produced between the cathode gas supply line 22 and the cathode gas output line 24, via the third bypass line 86, into the cathode gas output line 26. The third orifice plate 84 ensures that, during operating phases in which no water is carried away from the first, the second and/or the third liquid separator 42, 46, 44 via the third bypass line 86, any leakage of gases from the cathode gas supply line 22 into the third bypass line 86 is kept as small as possible.

In the same way as the reservoirs 48, 52 for the first and the second liquid separators 42, 46, the reservoir 50 for the third liquid separator 44 is also designed such that it is able for this purpose to store water to be carried away through the third bypass line 86 until the third bypass line 86 has been sufficiently heated by the electrical heating and/or by the heat created during operation of the fuel cell system 10 in order to overcome any blockage, formed by ice, in the third bypass line 86 and/or in the third orifice plate 88.

What is claimed is:

1. A fuel cell system comprising:
   at least one fuel cell having an anode area and a cathode area separated from the anode area by an electrolyte, the cathode area having a cathode gas output line;
   a first liquid separator having a first liquid outlet;
   a second liquid separator having a reservoir and a level sensor for measurement of a liquid level in the reservoir, the second liquid separator having a second liquid outlet connected to a liquid output line, the second liquid separator having a valve arranged in the liquid output line, the valve opening the liquid output line when the liquid level in the reservoir has reached a predetermined height;
   a first bypass line extending from the liquid outlet of the first liquid separator to the second liquid separator or to the cathode gas output line; and
   an orifice plate in the first bypass line,
   the first bypass line being heated by at least one of an electrical heater and operational heat to ensure melting of any frozen fluid in the first bypass line,
   the first liquid separator not including a level sensor for measurement of the liquid level in the first liquid separator or a valve for emptying the liquid out of the first liquid separator in a controlled manner such that the liquid separated out by the first liquid separator is carried away from the first liquid separator to the second liquid separator continuously via the first bypass line.

2. The fuel cell system as recited in claim 1 wherein the first liquid separator is arranged in a first area of the fuel cell system, the first area having a first pressure, the first bypass line connecting the liquid outlet to a second area of the fuel cell system, the second area having a second pressure lower than the first pressure.

3. The fuel cell system as recited in claim 1 further comprising a first feed device feeding liquid to be carried away from the liquid outlet into the cathode gas output line or the second liquid separator.

4. The fuel cell system as recited in claim 1 wherein the second liquid outlet is connected via a second bypass line to a third liquid separator or to the cathode gas output line.

5. The fuel cell system as recited in claim 4 wherein the second liquid separator is arranged in a second area of the fuel cell system having a second pressure, and in that the second bypass line connects the second liquid outlet to a third area of the fuel cell system having a third pressure lower than the second pressure.

6. The fuel cell system as recited in claim 4 further comprising a second feed device feeding liquid to be carried away from the second liquid outlet into the cathode gas output line or the third liquid separator.

7. The fuel cell system as recited in claim 4 further comprising the third liquid separator, the third liquid separator having a reservoir and a level sensor for measurement of a liquid level in the reservoir, with a further liquid outlet of the third liquid separator being connected to a liquid output line.

8. The fuel cell system as recited in claim 7 further comprising a valve arranged in the liquid output line, the valve opening the liquid output line when the liquid level in the reservoir has reached a predetermined height.

9. The fuel cell system as recited in claim 4 further comprising the third liquid separator, the third liquid separator having a third liquid outlet connected via a third bypass line to the cathode gas output line.

10. The fuel cell system as recited in claim 1 wherein the first bypass line opens into a fluid line connected to an inlet of the second liquid separator, or the first bypass line is connected directly to the second liquid separator.

11. The fuel cell system as recited in claim 4 wherein a second bypass line opens into a fluid line connected to an inlet of a third liquid separator, or the second bypass line is connected directly to the third liquid separator.

12. The fuel cell system as recited in claim 1 further comprising a liquid-filled U-tube in the first bypass line or another bypass line.

13. The fuel cell system as recited in claim 1 further comprising means for heating of a further bypass line.

14. The fuel cell system as recited in claim 1 wherein the reservoir stores liquid to be carried away from the second liquid separator until the first or a further bypass line or an orifice plate has been sufficiently heated in order to ensure that the liquid is carried away correctly from the second liquid separator even at temperatures below a freezing point.

15. A fuel cell system comprising:
at least one fuel cell having an anode area and a cathode area separated from the anode area by an electrolyte;
a first liquid separator having a first liquid outlet;
a second liquid separator having a second liquid outlet, the first liquid outlet being connected via a first bypass line to the second liquid separator or to a cathode gas output line,
the first bypass line capable of being heated by at least one of operational heat and an electrical heater to ensure melting of any frozen fluid in the first bypass line;
an orifice plate in the first bypass line for limiting the volume flow from the first liquid separator through the first bypass line;
a third liquid separator removing liquid from cathode gas entering into the cathode area, the second liquid outlet being coupled to the third liquid separator such that liquid exiting the second liquid outlet enters into the third liquid separator.

16. A method for operating a fuel cell system including at least one fuel cell having an anode area and a cathode area separated from the anode area by an electrolyte, and a first liquid separator having a liquid outlet, the liquid outlet being connected via a first bypass line to a second liquid separator or to a cathode gas output line, the method comprising:
heating the first bypass line via at least one of operational heat and an electrical heater to remove any frozen liquid in the first bypass line; and
providing an orifice plate in the first bypass line to ensure that leakage of gases from the first liquid separator to the second liquid separator is kept as small as possible.

17. The fuel cell system recited in claim 15 further comprising a cathode gas supply line supplying cathode gas to the cathode area and a second bypass line extending from the second liquid outlet to the cathode gas supply line.

18. The fuel cell system recited in claim 15 wherein the third liquid separator has a reservoir and a level sensor for measurement of a liquid level in the reservoir, the third liquid separator having a third liquid outlet connected to a liquid output line, the third liquid separator having a valve arranged in the liquid output line, the valve opening the liquid output line when the liquid level in the reservoir has reached a predetermined height,
the first liquid separator not including a level sensor for measurement of the liquid level in the first liquid separator or a valve for emptying the liquid out of the first liquid separator in a controlled manner such that the liquid separated out by the first liquid separator is carried away from the first liquid separator towards the second liquid separator continuously via the first bypass line,
the second liquid separator not including a level sensor for measurement of the liquid level in the first liquid separator or a valve for emptying the liquid out of the first liquid separator in a controlled manner such that the liquid separated out by the second liquid separator is carried away from the second liquid separator towards the third liquid separator continuously.

19. The fuel cell system recited in claim 15 wherein the third liquid separator includes a third liquid outlet, the third liquid outlet being coupled to a cathode gas output line of the cathode area.

* * * * *